United States Patent
Lou et al.

(10) Patent No.: US 7,509,049 B2
(45) Date of Patent: Mar. 24, 2009

(54) SYSTEM FOR SELECTIVELY COMBINING SATELLITE SIGNALS SENT TO A USER THROUGH AN OPTICAL FIBER

(75) Inventors: Xiaoming Lou, Arcadia, CA (US); Henok Tafase, Long Beach, CA (US); Thomas Schrans, Temple City, CA (US); Frank Berardi, Arcadia, CA (US); Hermie De Guzman, Culver City, CA (US)

(73) Assignee: Emcore Corporation, Albuquerque, NM (US)

( * ) Notice: Subject to any disclaimer, the term of this patent is extended or adjusted under 35 U.S.C. 154(b) by 611 days.

(21) Appl. No.: 11/040,918

(22) Filed: Jan. 24, 2005

(65) Prior Publication Data

US 2006/0193635 A1  Aug. 31, 2006

(51) Int. Cl.
*H04B 10/00* (2006.01)
(52) U.S. Cl. .................. 398/115; 398/121; 398/128; 398/130; 398/135; 398/138; 398/139; 398/141; 398/79; 398/183; 398/202; 725/121; 725/127; 725/129; 725/105; 725/106; 370/390; 370/480; 370/389; 455/103; 455/13.1; 455/12.1
(58) Field of Classification Search .............. 398/66, 398/67, 68, 69, 70, 71, 72, 75, 76, 79, 90, 398/91, 98, 99, 100, 182, 202, 141, 187, 398/186, 183, 167.5, 115, 121, 116, 128, 398/130, 135, 138, 139, 140, 184, 214; 725/129, 725/121, 127, 105, 106; 455/103, 12.1, 13.1, 455/5.1; 370/480, 390, 389, 316
See application file for complete search history.

(56) References Cited

U.S. PATENT DOCUMENTS

| | | | | |
|---|---|---|---|---|
| 6,353,490 B1 * | 3/2002 | Singer et al. | ................... | 398/66 |
| 6,538,781 B1 * | 3/2003 | Beierle et al. | ................... | 398/79 |
| 6,782,048 B2 * | 8/2004 | Santhoff | ...................... | 375/240 |
| 7,085,495 B2 * | 8/2006 | Birk et al. | ...................... | 398/71 |
| 7,239,808 B2 * | 7/2007 | Lee et al. | ...................... | 398/66 |
| 7,289,732 B2 * | 10/2007 | Koh et al. | ...................... | 398/75 |
| 2003/0152386 A1 * | 8/2003 | Vohra et al. | ................... | 398/76 |
| 2006/0048197 A1 * | 3/2006 | Petruzzelli | ................... | 725/100 |
| 2007/0111661 A1 * | 5/2007 | Bargroff et al. | ............. | 455/13.3 |

* cited by examiner

*Primary Examiner*—Hanh Phan

(57) ABSTRACT

A method and apparatus are provided for transferring a plurality of satellite signals through an optical communication network. The method includes the steps of selecting a frequency of a local oscillator signal within a guardband between a left polarization signal and a right polarization signal of a first satellite signal of the plurality of satellite signals, frequency shifting the first satellite signal upwards in frequency by the selected frequency. The method further includes the steps of combining the frequency shifted satellite signal with a second satellite signal of the plurality of satellite signals and modulating a optical carrier with the combined signals, transferring the modulated optical carrier to a receiver through an optical fiber and decoding the first and second satellite signals within the receiver.

20 Claims, 4 Drawing Sheets

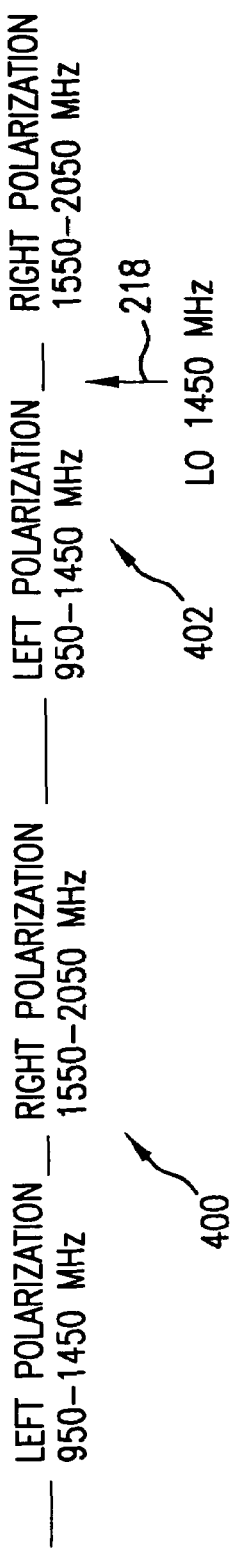
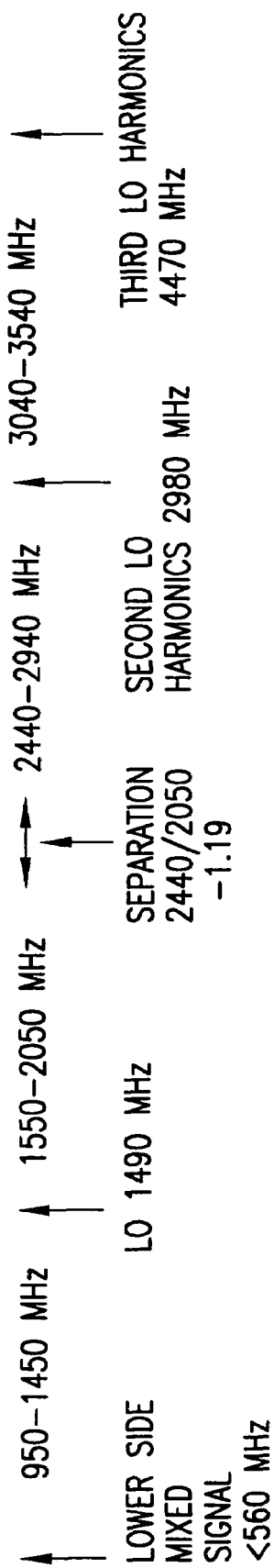
FIG.4a
FIG.4b

SYSTEM FOR SELECTIVELY COMBINING SATELLITE SIGNALS SENT TO A USER THROUGH AN OPTICAL FIBER

FIELD OF THE INVENTION

The field of the invention relates to satellite systems and more particularly to methods of delivering satellite signals to consumers.

BACKGROUND OF THE INVENTION

Community antenna television (CATV) is well known. Typically, one or more antenna are located at a central location and aligned with a set of respective satellites. Communication signals received from the respective satellites may be processed and distributed to CATV subscribers through a copper conductor.

The processing of satellite signals typically means downconverting the signals from a satellite transmission band to a CATV distribution system band where both bands are in the radio frequency (rf) range. Once downconverted to a distribution band, the signal is filtered and distributed to subscribers on a CATV cable.

The satellites used in CATV typically reside in geosynchronous orbits. To receive a satellite signal, a receiving antenna must be directed towards the satellite. While the antenna is receiving a signal from a first satellite, the antenna cannot receive signals from other satellites.

As an alternative to CATV, consumer satellite receivers (e.g., DirecTV) are also available. Satellite antenna for these systems can receive the signals of up to three satellites. However, the setup of this type of antenna is difficult, the cost is high and the antenna requires a convenient location on the subscriber's premises for installation, which is difficult especially in crowded residential areas.

Recently, a new system called Fiber To The User (FTTU) has been announced for use by telecommunications providers. Under the FTTU system, cable television and telephone may be combined into a two-way optical signaling system that is connected between provider and subscriber.

Using the Passive Optical Networking (PON) of FTTU, a provider may modulate one or more optical carriers with rf communication signals (e.g., satellite signals). The modulated optical carriers may then be combined and distributed to subscribers over a single optical fiber using a process called Wavelength Division Multiplexing (WMD).

While the use of WMD in the distribution of optical satellite signals is effective, the hardware necessary to separate optical signals of different optical wavelengths is overly complex and expensive. Accordingly, a need exists for a more flexible method of combining satellite signals onto a single optical carrier.

BRIEF DESCRIPTION OF THE DRAWINGS

FIG. 4 depicts a frequency use plan that may be use by the system of FIG. 1.

SUMMARY

A method and apparatus are provided for transferring a plurality of satellite signals through an optical communication network. The method includes the steps of selecting a frequency of a local oscillator signal within a guardband between a left polarization signal and a right polarization signal of a first satellite signal of the plurality of satellite signals, frequency shifting the first satellite signal upwards in frequency by the selected frequency. The method further includes the steps of combining the frequency shifted satellite signal with a second satellite signal of the plurality of satellite signals and modulating a optical carrier with the combined signals, transferring the modulated optical carrier to a receiver through an optical fiber and decoding the first and second satellite signals within the receiver.

DETAILED DESCRIPTION OF AN ILLUSTRATED EMBODIMENT

Figure 1:
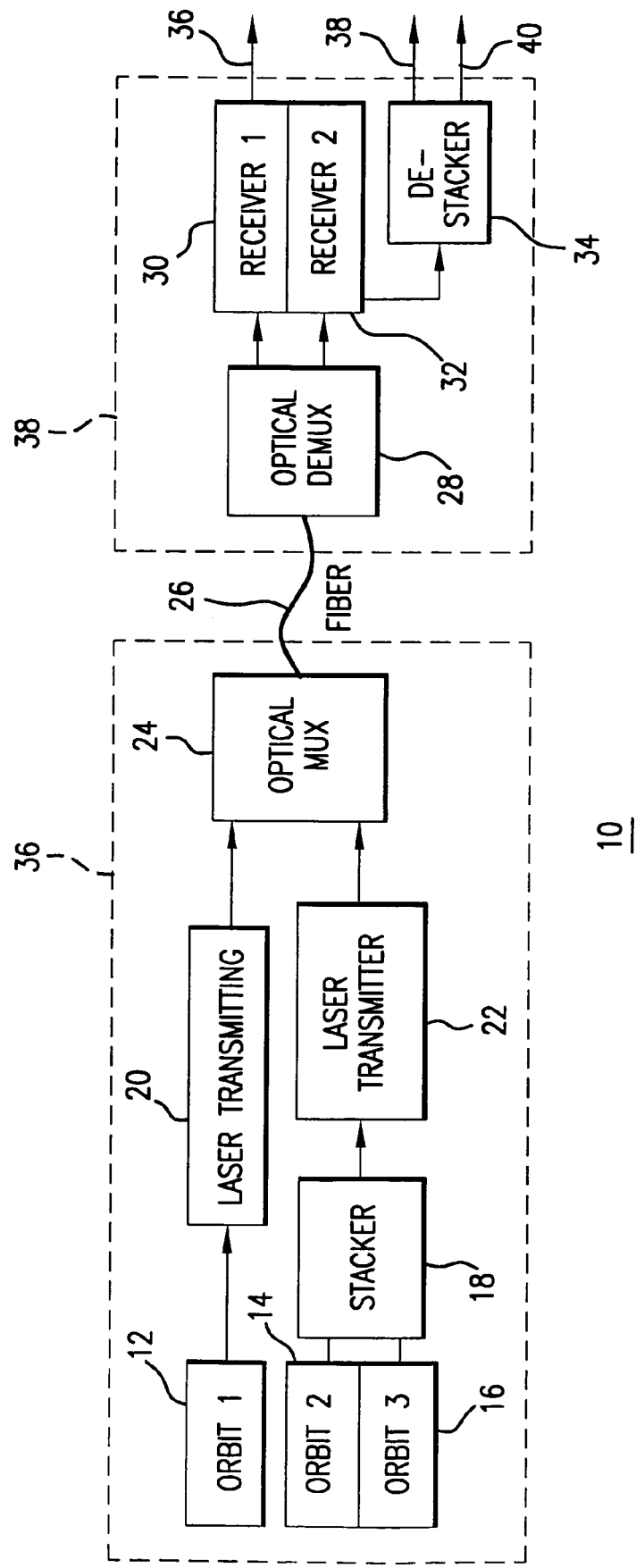
FIG. 1 is a simplified block diagram of a CATV transmission system in accordance with an illustrated embodiment of the invention.

FIG. 1 is a simplified block diagram of an optical satellite signal transmission system 10, shown generally in accordance with an illustrated embodiment of the invention. The system 10 may include one or more transmitters 36 (e.g., used by a CATV operator to distribute CATV signals to subscribers) coupled through an optical fiber 26 to a receiver 38 (e.g., located in the home of a subscriber).

The transmitter 36 may combine multiple satellite communication (Sat Comm) signals for transmission using a single optical carrier or may use multiple optical carriers. Even in the case of where multiple optical carriers are combined, the transmitter 36 may transmit the multiple optical carriers over a single optical fiber 26.

As shown in FIG. 1, the system 10 may receive signals from a number of satellites 12, 14, 16. A first signal from a first satellite 12 may be downconverted to some appropriate rf frequency and used to modulate a first laser transmitter 20.

Second and third signals from respective second satellite and third satellites 14, 16 may be downconverted, frequency adjusted relative to one another and spectrally stacked within a stacker 18. The combined first and second satellite signals may then be used to modulate a second laser transmitter 22.

The optical signals from the first and second laser transmitters 20, 22 may be combined to produce an optical WMD signal within an optical multiplexer 24. Optical multiplexing, in this case, may simply mean combining modulated optical carriers using an optical splitter that is connected backwards to operate as a combiner.

From the multiplexer 24, the combined optical signal may be transmitted through a fiber 26 to the receiver 38 located in the home of a subscriber. Within the receiver 38, the signal may be demultiplexed within an optical multiplexer 28.

Demultiplexing, in the case may mean separating the respective optical carriers. Demultiplexing may occur through the use of one or more optical filters (e.g., Bragg filters).

Located within the receiver 38 may be one or more sub-receivers 30, 32. Within the sub-recievers 30, 32, the respective carriers may be detected. The stacked second and third satellite signals may be separated and recovered within a destacker 34. The recovered first, second and third satellite signals may be provided on a set of respective outputs 36, 38, 40 for further decoding depending upon the application.

Figure 2:
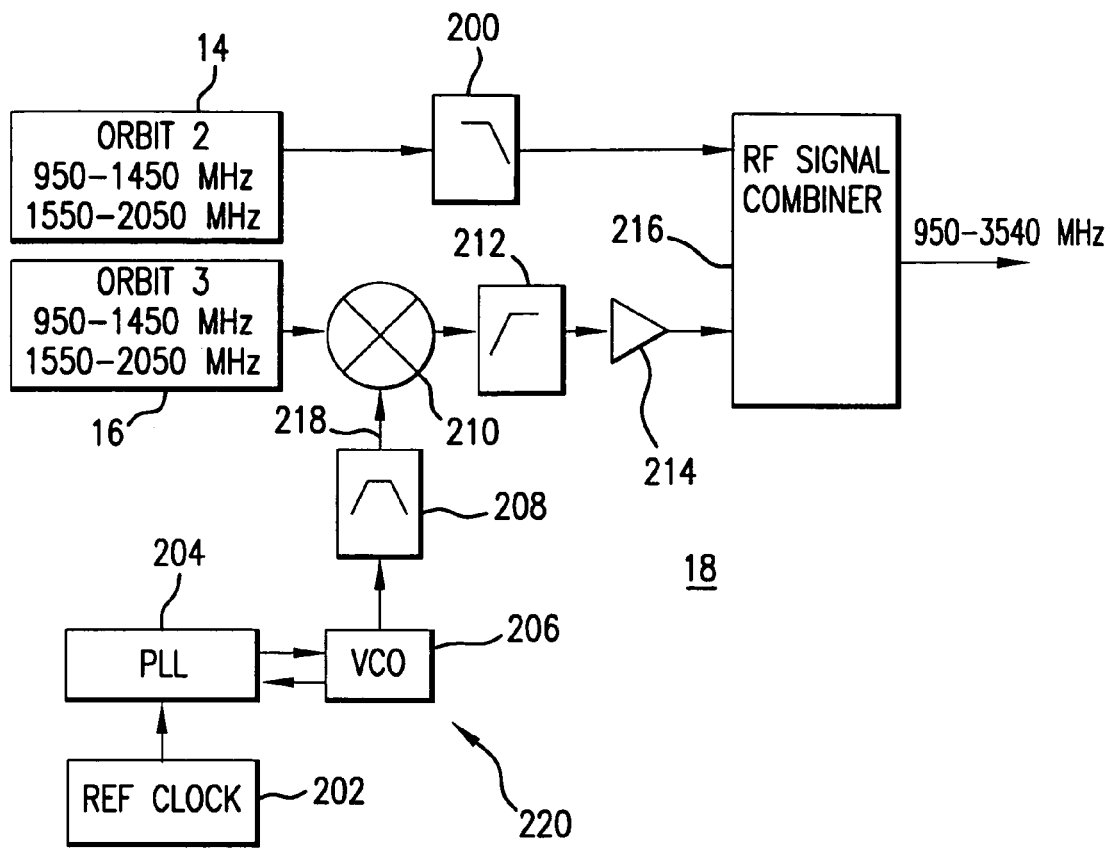
FIG. 2 is a block diagram of a transmitter of the system of FIG. 1.
Figure 3:
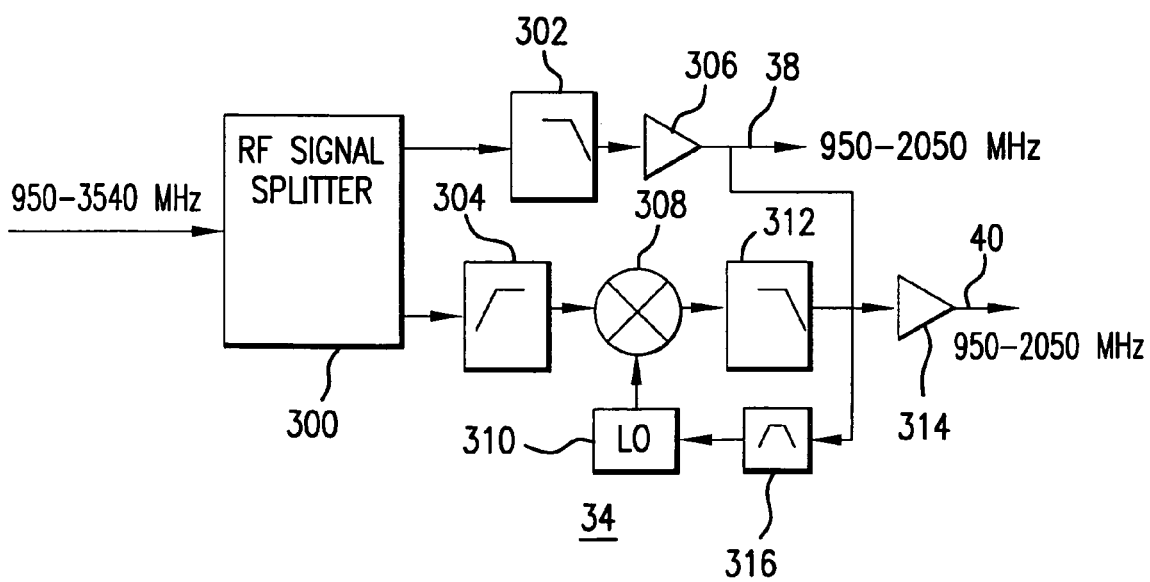
FIG. 3 is a block diagram of a receiver of the system of FIG. 1.

Turning now to the specifics of stacking, FIG. 2 is a block diagram of the stacker 18 of FIG. 1 and FIG. 3 is a block diagram of the destacker 34 of FIG. 1. FIGS. 4a and 4b depict a stacking plan used by the system 10.

FIG. 4a graphically shows a signal layout of the second and third satellite signals and the relative spectral location (e.g., 1490 MHz) of a local oscillator signal 218 that is mixed with the third satellite signal. FIG. 4b shows a frequency spectrum of an output signal produced by spectrally stacking the signals from the second and third satellites within the stacker 18 and the relative locations of those satellite signals under this particular example.

As shown in FIG. 4a, the signal from the second satellite 14 (depicted by reference number 400 in FIG. 4a) has a left polarization component that occupies the spectral location from 950 MHz to 1450 MHz and a right polarization component that occupies the region from 1550 MHz to 2050 MHz. The signal 402 from the third satellite 16 occupies an identical spectral location.

In order to stack the two satellite signals, the second satellite signal 400 from the second satellite 14 may be low-pass filtered (FIG. 2) within a filter 200 having an upper limit of 2050 MHz and provided as in input to a rf signal combiner 216. The third satellite signal 402 may be frequency shifted before being combined with the second signal 400 in the combiner 216.

Frequency shifting may be accomplished via a local oscillator signal 218 provided by a local oscillator 220. As shown graphically in FIG. 4a, the local oscillator frequency 218 is located in the guard band (e.g., substantially at the center of the frequency ranges) of the second and third satellite signals 400, 402. This arrangement reduces the spurious noise in the stacked signals due to leakage of harmonics from the local oscillator.

The local oscillator 220 may generate the local oscillator signal 218 using a voltage controlled oscillator (VCO) 206 that is phase-locked using a phase-locked loop (PLL) 204 to a reference clock 202. The output signal from the VCO 206 may be notch filtered within a notch filter 208 to provide the local oscillator signal 218 described above.

The local oscillator signal 218 is mixed with the third satellite signal 402 in a mixer 210. Mixing of the third satellite signal 402 with a local oscillator signal 218 (centered between the left and right polarization components of the third satellite signal 402) causes sum and difference frequencies. However, the difference frequencies all lie below 560 MHz and, therefore do not interfere with either satellite signal 400, 402.

The sum of the local oscillator signal 218 and third satellite signal 402 cause the third satellite signal 402 to become a frequency shifted third satellite signal 404 occupying the frequency ranges of 2440-2940 MHz and 3040-3540 MHz, as shown in FIG. 4b. As also shown in FIG. 4b, the local oscillator signal 218 and harmonics of the local oscillator signal 218 all lie outside of the left and right polarization components of the second satellite signal 400 and the frequency shifted left and right polarization components of the third satellite signal 404. As may be noted from FIG. 4b, the oscillator signal 218 lies in the guard band of the second satellite signal, the second harmonic of the oscillator signal 218 lies in the guard band of the shifted third satellite signal and the third harmonic lies above the shifted third satellite signal. The separation of the two stacked satellite bands (FIG. 4b) is arranged to be large enough for easy de-stacking, but limited by the frequency band of optical transmitter and receiver.

Once the third satellite signal 402 is frequency shifted to the ranges of 2440-2940 MHz and 3040-3540 MHz, the frequency shifted signal 404 may be high pass filtered in a filter 212, amplified in an amplifier 214 and combined (stacked) with the second satellite signal 400 in the combiner 216. The combined second satellite signal 400 and frequency shifted third satellite signal 404 may then be used to drive the laser transmitter 22 (FIG. 1).

Destacking within the receiver 38 may occur in a substantially similar manner. The optical carrier from the transmitter 22 is detected in the sub-receiver 32 and split into first and second rf signals within a signal splitter 300 (FIG. 3). The second satellite signal 400 is isolated by low pass filtering within a filter 302 that passes any signal below 2050 MHz. The recovered second satellite signal 400 may be amplified in an amplifier 306 and provided for further processing as required by the subscriber.

The frequency shifted third satellite signal 404 may be isolated by high pass filtering within a high pass filter 304 that passes any signal above 2050 MHz. The frequency shifted third satellite signal 404 may by downshifted to baseband by mixing the frequency shifted signal with a local oscillator signal from a local oscillator signal source 310 operating at substantially the same frequency as the local oscillator 220 of the transmitter.

In this regard, the local oscillator signal 218 of the transmitter 36 may be recovered from a guard band of the stacked Sat Com signals shown in FIG. 4b. For example, the stacked Sat Com signal has signal bands for the second satellite in the frequency ranges of from 950 to 1450 MHz and from 1550 to 2050 MHz. The fundamental frequency of the local oscillator signal 218 may be found at 1490 MHz. Therefore the local oscillator frequency 218 is sent along with the stacked Sat Com signals from transmitter 36 to receiver 38 and may be retrieved within the receiver 38.

A notch filter 316 may be used to recover the local oscillator signal 218 of the transmitter 36 from the recovered amplified signal of the second satellite. The recovered local oscillator signal 218 may be amplified in the amplifier 310 and mixed with the frequency shifted third satellite signal 404 in the mixer 308. Mixing of the shifted third satellite signal 404 with the recovered local oscillator frequency 218 shifts the third satellite signal to baseband.

The recovery of the local oscillator signal 218 from the transmitted signal eliminates the need for a VCO, PLL and reference clock within the receiver 38 that would otherwise be necessary to generate a local oscillator signal for use within the destacker 34. In addition, because the local oscillator signal recovered within the de-stacker operates at the same frequency as the stacker, there is no frequency shift in the recovered signal within the receiver.

Once at baseband, the third oscillator signal 402 may be low pass filtered in a low pass filter 312 and amplified in an amplifier 314. The filtered and amplified third oscillator signal 402 may be provided on an output 40 for further processing for the benefit of the subscriber.

Figure 5:
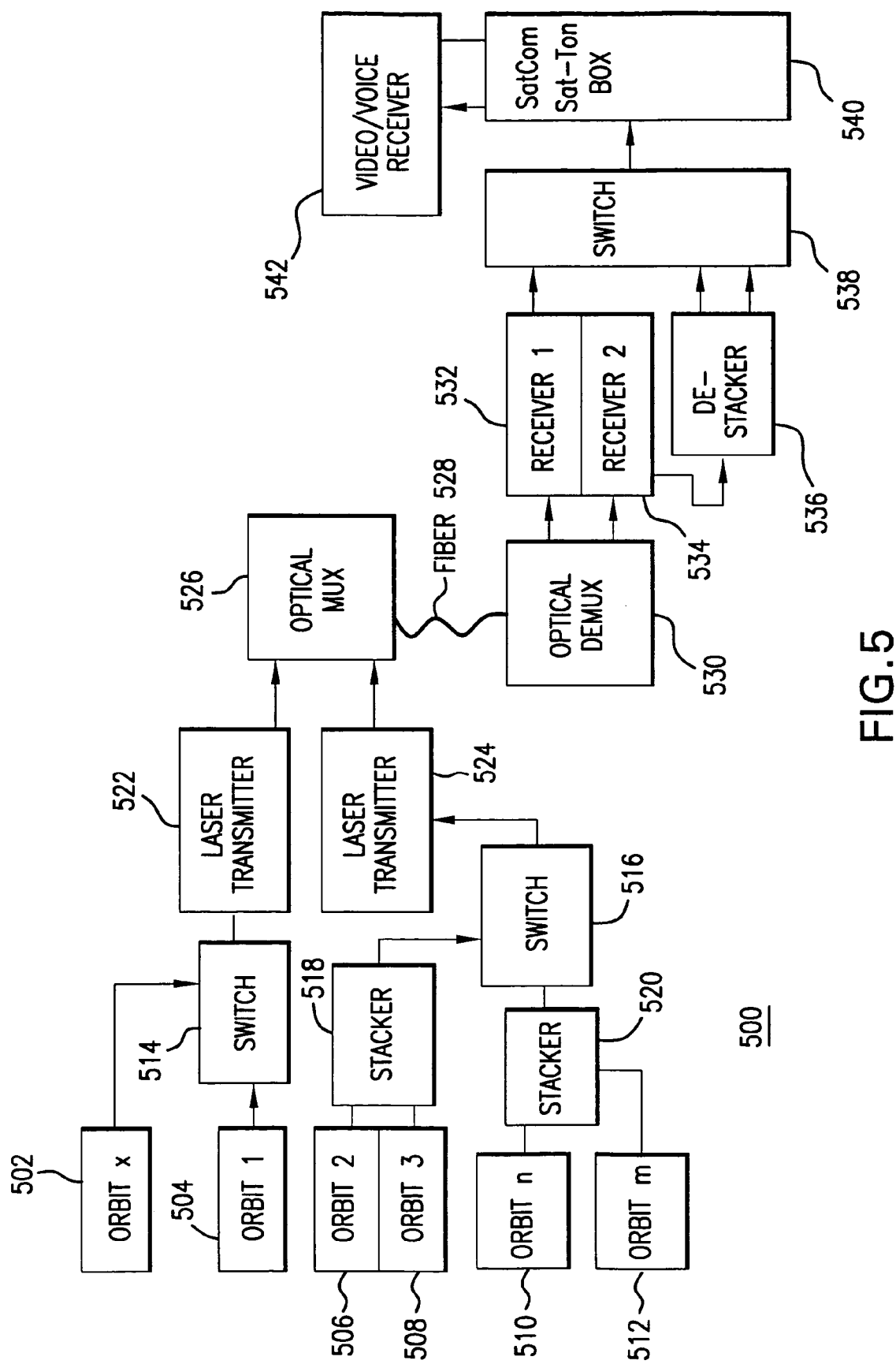
FIG. 5 depicts the system of FIG. 1 in a context of use.

FIG. 5 shows an example of the system 10 of FIG. 1 incorporated into a more comprehensive CATV system. In this case, signals may be received from any of a number of satellites 502, 504, 506, 508, 510, 512. In this case, signals from a third and a fourth satellites 506, 508 may be stacked in a first stacker 518 and signals from a fifth and sixth satellite 510, 512 may be stacked in a second stacker 520.

Either the stacked signals from the third and fourth satellites 506, 508 or the stacked signals from the fifth and sixth satellites 510, 512 may be selected using a switch 516. Similarly, a first satellite 504 or a second satellite 502 may be selected in another switch 514.

The satellite signal selected in the first switch 514 may be converted into a modulated carrier in a laser transmitter 522. The stacked signal selected by the switch 516 may be used to modulate a second transmitter 524. The modulated carriers from the laser transmitters 522, 524 may be combined within a multiplexer 526 and transferred to a receiver through the optical fiber 528.

Within the receiver of FIG. 5, the first optical carrier with a satellite signal selected via switch 514 may be detected in a first sub-receiver 532. A second optical carrier with stacked satellite signals selected via switch 516 may be detected in a second sub-receiver 534.

The satellite signal detected within the second sub-receiver 534 may be destacked in destacker 536 and provided as inputs to a switch 538. The satellite signal selected via the switch 538 may be applied to a set-top box 540 in the home of the subscriber. Where the selected signal is cable television, the selected audio/visual signal may be reproduced through an audio/visual receiver 542.

A specific embodiment of method and apparatus for distributing communication signals has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of transferring a plurality of satellite signals each occupying a substantially identical, predetermined satellite transmission frequency through an optical communication network, such method comprising:
   selecting a frequency of a local oscillator signal within a guardband between a left polarization signal and a right polarization signal of a first satellite signal of the plurality of satellite signals;
   frequency shifting the first satellite signal upwards in frequency by the selected frequency;
   combining the frequency shifted satellite signal and selected frequency with a second satellite signal of the plurality of satellite signals so that the selected frequency occupies a corresponding guardband between the left and right polarization signals of the second satellite signal at the predetermined satellite transmission frequency;
   modulating a optical carrier with the combined signals; and
   transferring the modulated optical carrier to a receiver through an optical fiber; and decoding the first and second satellite signals within the receiver.

2. The method of transferring the plurality of satellite signals as in claim 1 wherein the step of decoding further comprises detecting the combined second satellite signal and frequency shifted first satellite signal.

3. The method of transferring the plurality of satellite signals as in claim 2 further comprising separating the combined second satellite signal and frequency shifted first satellite signal.

4. The method of transferring the plurality of satellite signals as in claim 3 further comprising recovering the selected local oscillator signal from within the guardband of the second satellite signal.

5. The method of transferring the plurality of satellite signals as in claim 4 further comprising mixing the recovered local oscillator frequency with the frequency shifted first satellite signal to baseband.

6. The method of transferring the plurality of satellite signals as in claim 1 further comprising frequency shifting a third satellite signal of the plurality of satellite signals upwards in frequency by the selected frequency.

7. The method of transferring the plurality of satellite signals as in claim 6 further comprising combining the frequency shifted third satellite signal with a fourth satellite signal of the plurality of satellite signals.

8. The method of transferring the plurality of satellite signals as in claim 7 further comprising using a switch to select either the combined first and second satellite signals or combined third and fourth satellite signals.

9. The method of transferring the plurality of satellite signals as in claim 1 further comprising modulating another optical carrier with another satellite signal of the plurality of satellite signals.

10. The method of transferring the plurality of satellite signals as in claim 9 further comprising combining the carrier modulated with the combined first and second satellite signals and the optical carrier modulated with the other satellite signal.

11. An apparatus for transferring a plurality of satellite signals each occupying a substantially identical, predetermined satellite transmission frequency through an optical communication network, such apparatus comprising:
   a transmitter that further comprises:
      a local oscillator that provides an oscillator signal with a frequency selected from within a guardband between a left polarization signal and a right polarization signal of a first satellite signal of the plurality of satellite signals;
      a mixer that mixes the local oscillator signal with the first satellite signal to frequency shift the first satellite signal upwards in frequency by the selected frequency; and
      a combiner that combines the frequency shifted satellite signal with a second satellite signal of the plurality of satellite signals so that the selected frequency occupies a corresponding guardband between the left and right polarization signals of the second satellite signal at the predetermined satellite transmission frequency;
      a laser modulated with the combined signals to produce a modulated optical carrier;
   a receiver that decodes the first and second satellite signals; and
   an optical fiber that connects the transmitter and receiver.

12. The apparatus for transferring the plurality of satellite signals as in claim 11 wherein the receiver further comprises a detector that detects the combined second satellite signal and frequency shifted first satellite signal.

13. The apparatus for transferring the plurality of satellite signals as in claim 12 further comprising a notch filter that recovers the selected local oscillator frequency from within the guardband of the second satellite signal.

14. The apparatus for transferring the plurality of satellite signals as in claim 13 further comprising a mixer that mixes the recovered local oscillator frequency with the frequency shifted first satellite signal to baseband.

15. The apparatus for transferring the plurality of satellite signals as in claim 11 further comprising a third satellite signal of the plurality of satellite signals that is frequency shifted upwards in frequency by the selected frequency.

16. The apparatus for transferring the plurality of satellite signals as in claim 15 further comprising a fourth satellite signal of the plurality of satellite signals that is combined the frequency shifted third satellite signal.

17. The apparatus for transferring the plurality of satellite signals as in claim 16 further comprising a selector switch used to select either the combined frequency shifted first satellite signal and second satellite signal or combined frequency shifted third satellite signal and fourth satellite signal.

18. The apparatus for transferring the plurality of satellite signals as in claim 11 further comprising another laser modulated with a fifth satellite signal.

19. The apparatus for transferring the plurality of satellite signals as in claim 18 further comprising a combiner that combines the carrier modulated with the combined second satellite signal and frequency shifted first satellite signal and the optical carrier modulated with the fifth satellite signal.

20. An apparatus for transferring a plurality of satellite signals each occupying a substantially identical, predetermined satellite transmission frequency through an optical communication network, such apparatus comprising:

means for selecting a frequency within a guardband between a left polarization signal and a right polarization signal of a first satellite signal of the plurality of satellite signals;

means for frequency shifting the first satellite signal upwards in frequency by the selected frequency;

means for combining the frequency shifted satellite signal with a second satellite signal of the plurality of satellite signals so that the selected frequency occupies a corresponding guardband between the left and right polarization signals of the second satellite signal at the predetermined satellite transmission frequency;

means for modulating a optical carrier with the combined signals; and means for transferring the modulated optical carrier to a receiver through an optical fiber; and means for decoding the first and second satellite signals within the receiver.

\* \* \* \* \*